United States Patent
Nakamura

(10) Patent No.: US 8,614,872 B2
(45) Date of Patent: Dec. 24, 2013

(54) SWITCHING POWER SOURCE APPARATUS

(75) Inventor: Masaru Nakamura, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 31 days.

(21) Appl. No.: 13/184,663

(22) Filed: Jul. 18, 2011

(65) Prior Publication Data

US 2012/0032660 A1    Feb. 9, 2012

(30) Foreign Application Priority Data

Aug. 6, 2010  (JP) ................... 2010-177815

(51) Int. Cl.
  *H02H 3/08*   (2006.01)
  *H02H 9/02*   (2006.01)
(52) U.S. Cl.
  USPC ........ 361/93.1; 361/93.2; 361/93.7; 361/93.9
(58) Field of Classification Search
  USPC ............... 361/93.1, 93.2, 93.7, 93.9
  See application file for complete search history.

(56) References Cited

U.S. PATENT DOCUMENTS

| | | | |
|---|---|---|---|
| 6,583,610 B2 | 6/2003 | Groom et al. | |
| 6,597,157 B1 * | 7/2003 | Boeckmann et al. | 323/242 |
| 7,227,731 B2 * | 6/2007 | Leith et al. | 361/93.1 |
| 7,817,391 B2 * | 10/2010 | Kimber | 361/87 |
| 2011/0304309 A1 | 12/2011 | Nakamura | |
| 2012/0032660 A1 | 2/2012 | Nakamura | |
| 2012/0032661 A1 | 2/2012 | Nakamura | |
| 2012/0043949 A1 | 2/2012 | Nakamura | |

FOREIGN PATENT DOCUMENTS

JP    2008-72891    3/2008

OTHER PUBLICATIONS

U.S. Appl. No. 13/150,624, filed Jun. 1, 2011, Nakamura.
U.S. Appl. No. 13/194,068, filed Jul. 29, 2011, Nakamura.
U.S. Appl. No. 13/209,808, filed Aug. 15, 2011, Nakamura.

* cited by examiner

*Primary Examiner* — Rexford Barnie
*Assistant Examiner* — Zeev V Kitov
(74) *Attorney, Agent, or Firm* — Oblon, Spivak, McClelland, Maier & Neustadt, L.L.P.

(57) ABSTRACT

A switching power source apparatus includes a high-side MOSFET 11, a ramp signal generator 18 to generate a ramp signal, an amplitude signal generator 2 to generate an amplitude signal Comp corresponding to an amplitude of the ramp signal, a superposing circuit 3 to generate a superposed signal by superposing a second ramp signal on a first reference voltage, a first feedback controller 1 to control the ON timing and ON width of the high-side MOSFET, an overcurrent detector to detect if a current of an output load is an overcurrent, and an OFF timer 26 to determine a period during which the high-side MOSFET 11 is forcibly turned off and generate a forcible OFF signal. If an overcurrent is detected, the controller 1 turns off the high-side MOSFET, and according to the forcible OFF signal, forcibly turns off the high-side MOSFET 11 for the determined period.

6 Claims, 16 Drawing Sheets

SWITCHING POWER SOURCE APPARATUS

BACKGROUND OF THE INVENTION

1. Field of the Invention

The present invention relates to a switching power source apparatus for supplying a stable DC voltage.

2. Description of Related Art

A DC-DC converter for supplying a source voltage to a digital signal processing LSI such as an image engine or a CPU is required to have an improved load response to minimize variation in an output voltage when the LSI dynamically changes its load. To meet the requirement, some DC-DC converter employs an error amplifier to compare an output voltage with a reference voltage. The error amplifier, however, causes a delay that may deteriorate the load response of the DC-DC converter. To avoid the delay caused by the error amplifier, a device that is widely used is a ripple converter employing no error amplifier, and instead, adopting PFM (pulse frequency modulation) control to improve load response with respect to the load of the digital device.

A PFM ripple converter according to a related art detects a ripple voltage in an output voltage, and to obtain a sufficient ripple signal, employs as an output capacitor an electrolytic capacitor having a large ESR (equivalent series resistance). The electrolytic capacitor, however, hinders compactness of the ripple converter.

To deal with this problem, U.S. Pat. No. 6,583,610 (Patent Document 1) and Japanese Unexamined Patent Application Publication No. 2008-72891 (Patent Document 2) disclose a technique of superposing a ramp signal assuming a ripple by ESR on a feedback voltage or reference voltage, to secure stable operation even when a ceramic capacitor having a small ESR is used as an output capacitor.

FIG. 1 is a circuit diagram illustrating a switching power source apparatus prepared according to the teachings of Patent Documents 1 and 2 and FIG. 2 is a timing chart illustrating operation of the apparatus of FIG. 1. With reference to FIGS. 1 and 2, operation of the switching power source apparatus employing the related-art ripple control technique with fixed ON width will be explained. The technique disclosed in Patent Documents 1 and 2 superposes a ramp signal on a feedback signal. This technique is operationally equivalent to a technique of superposing a ramp signal on a reference voltage, and therefore, the apparatus and operation of FIGS. 1 and 2 will be explained in connection with the technique of superposing a ramp signal on a reference voltage because it is convenient for explaining embodiments of the present invention.

In FIG. 1, a ramp generator 18 generates a ramp signal Ramp assuming a ripple signal by ESR and outputs the ramp signal Ramp to a superposing circuit 3. The superposing circuit 3 superposes the ramp signal Ramp having a positive inclination on a first reference voltage REF, to generate a second reference voltage REF2, which is outputted to a positive input terminal of a feedback comparator 4.

A negative input terminal of the feedback comparator 4 receives a feedback voltage FB. The feedback voltage FB is produced by dividing an output voltage Vout by feedback voltage dividing resistors 16 and 17. If the feedback voltage FB is lower than the second reference voltage REF2, the feedback comparator 4 immediately outputs a signal FB_TRG to a one-shot circuit 5a.

In response to the signal FB_TRG, the one-shot circuit 5a outputs a signal ON_TRG having a predetermined time width to a terminal Set of an ON timer 7b.

A feedforward circuit 6b maintains a predetermined switching frequency even if an input voltage Vin and the output voltage Vout change. For this, the feedforward circuit 6b detects the input voltage Vin and output voltage Vout, generates a feedforward signal Iton that is proportional to the input voltage Vin and inversely proportional to the output voltage Vout, and outputs the same to a terminal Adj of the ON timer 7b.

The ON timer 7b uses as a trigger the signal ON_TRG from the one-shot circuit 5a and outputs a signal Ton corresponding to the feedforward signal Iton to a drive logic circuit 8. The larger the feedforward signal Iton, the narrower the time width of the signal Ton.

Based on the signal Ton from the ON timer 7b, the drive logic 8 outputs a drive signal Hon for a high-side driver 9 and a drive signal Lon for a low-side driver 10. The drive logic 8 detects, from a signal SW, that a regenerative period ends and the polarity of a current IL passing through an inductor 13 inverts, and then, changes the drive signal Lon from high to low to turn off a low-side MOSFET 12, thereby preventing the inductor current IL from excessively passing in a reverse direction and avoiding a useless loss.

In response to the signal Hon from the drive logic 8, the high-side driver 9 drives a gate of a high-side MOSFET 11, to supply energy through the inductor 13 to an output capacitor 14 and output load 15.

In response to the signal Lon from the drive logic 8, the low-side driver 10 drives a gate of the low-side MOSFET 12, to turn on the low-side MOSFET 12 in a regenerative period of the inductor current IL after the high-side MOSFET 11 is turned off, thereby reducing a conduction loss.

In this way, the switching power source apparatus of FIG. 1 turns on the high-side MOSFET 11 as soon as the output voltage Vout decreases due to a sudden change from light load to heavy load in an output load current Iout, thereby improving a load response. In addition, the apparatus of FIG. 1 enables a ceramic capacitor to be used as an output capacitor, which the related-art ripple control technique is unachievable.

SUMMARY OF THE INVENTION

The technique of superposing a ramp signal having a given inclination on the feedback voltage FB or reference voltage REF according to Patent Documents 1 and 2, however, has a problem. A change in the output load current Iout results in changing the switching frequency of the high-side MOSFET 11 and the amplitude of the ramp signal Ramp. This results in changing the output voltage Vout, to deteriorate a load regulation that is an important characteristic of the DC-DC converter. This will be explained in detail with reference to the timing chart of FIG. 2.

When the output load current Iout suddenly changes from heavy load to light load, the output voltage Vout momentarily jumps, and thereafter, decreases as time passes. When the feedback signal FB decreases below a peak of the second reference voltage REF2 on which the ramp signal Ramp is superposed, the one-shot circuit 5a outputs the ON trigger signal ON_TRG to turn on the high-side MOSFET 11. However, the smaller the output load current Tout, the longer the ON timing of the high-side MOSFET 11 delays. Namely, the lower the output load current Iout, the lower the switching frequency of the high-side MOSFET 11.

When the switching frequency decreases, the amplitude of the ramp signal Ramp superposed on the first reference voltage REF increases, and therefore, the second reference voltage REF2 becomes larger than that under heavy load. This results in deteriorating the load regulation characteristic of the switching power source apparatus. As illustrated in FIG. 2, the output voltage Vout sharply drops when the light load changes to heavy load and does not recover thereafter. This means that there is a large voltage difference between light load and heavy load, to deteriorate the load regulation characteristic.

To improve the load regulation characteristic, the amplitude of the ramp signal Ramp superposed on the second reference voltage REF2 must be decreased. This, however, destabilizes operation because the output capacitor of the switching power source apparatus is a ceramic capacitor having a small ESR for compactness of the switching power source apparatus.

An overcurrent protection function is an important function for the DC-DC converter. Under heavy load or in an abnormal state such as a short circuit of output load, the overcurrent protection function detects an overcurrent based on a drain current of the high-side MOSFET 11 or low-side MOSFET 12 or a current passing through the inductor 13 and stops the switching operation pulse by pulse, thereby narrowing the ON width of the power MOSFET and preventing the same from breaking. The switching power source apparatus must be provided with a proper overcurrent protection circuit to realize an ideal overcurrent protection characteristic.

In consideration of the problems of the related arts, the present invention provides a switching power source apparatus capable of realizing a proper overcurrent protection characteristic, carrying out a stable operation even with an output capacitor having a small ESR, and securing a good load regulation characteristic.

According to an aspect of the present invention, the switching power source apparatus includes a high-side switch connected between an input voltage line and an inductor, a ramp signal generator configured to generate a ramp signal in synchronization with a switching frequency of the high-side switch, a superposing circuit configured to generate a second ramp signal having a positive inclination corresponding to the amplitude and frequency of the ramp signal and provide a superposed signal by superposing the second ramp signal on a first reference voltage, a controller configured to compare the superposed signal with a feedback signal corresponding to an output voltage, and if the feedback signal is lower than the superposed signal, control the ON timing of the high-side switch so that the high-side switch turns on, an overcurrent detector configured to detect if a current of an output load is an overcurrent, and an OFF timer configured to determine, based on a detection result of the overcurrent detector, the input voltage, and the output voltage, a period during which the high-side switch is forcibly turned off and generate a forcible OFF signal based on the determined period. If the overcurrent detector detects an overcurrent, the controller turns off the high-side switch, and according to the forcible OFF signal, forcibly turns off the high-side switch for the determined period.

BRIEF DESCRIPTION OF THE DRAWINGS

FIG. 18 is a circuit diagram illustrating a second sample hold circuit arranged in the switching power source apparatus of

FIG. 17; and

DESCRIPTION OF PREFERRED EMBODIMENTS

Switching power source apparatuses according to embodiments of the present invention will be explained in detail with reference to the drawings.
Embodiment 1

Figure 1:
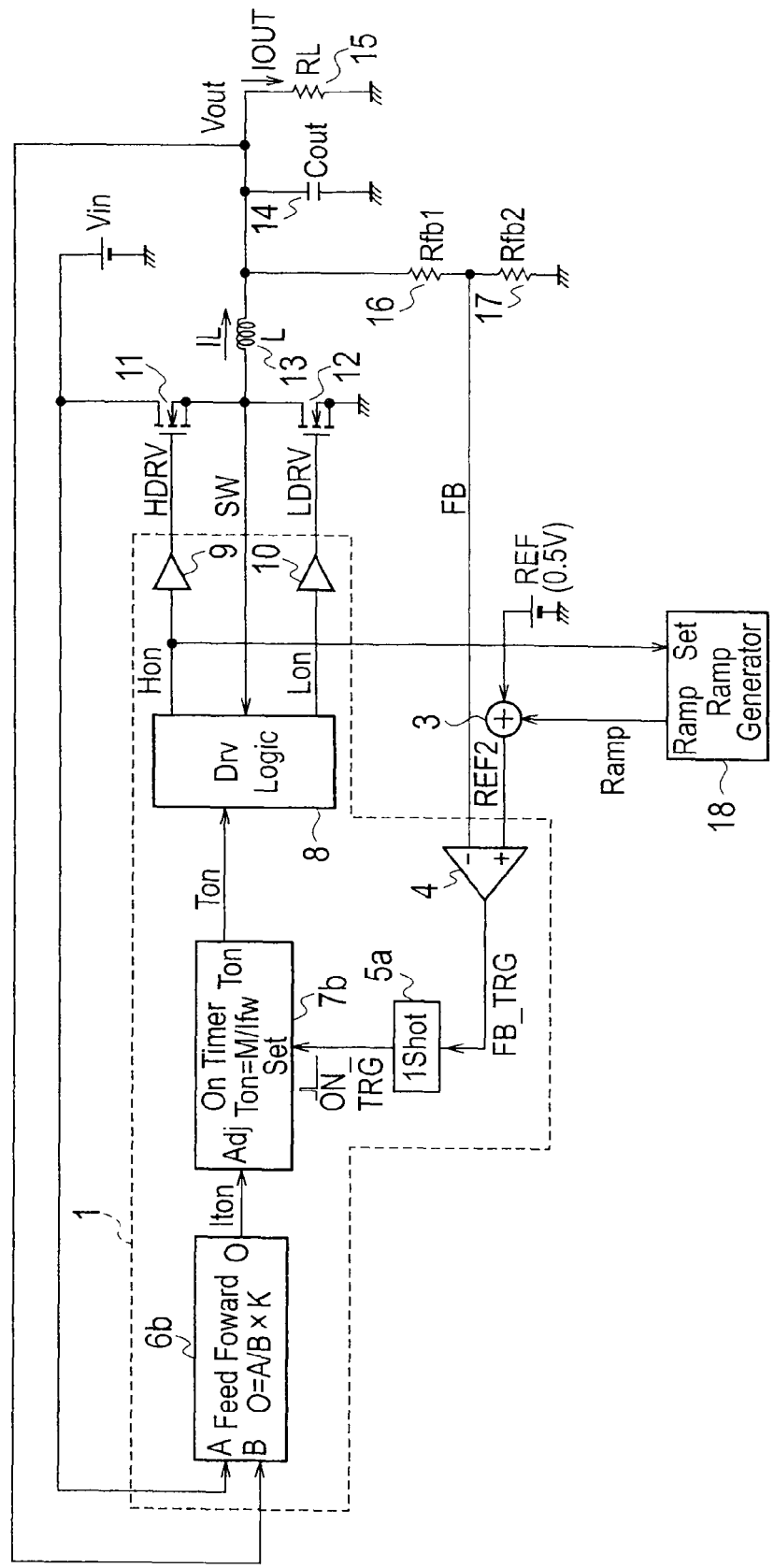
FIG. 1 is a circuit diagram illustrating a switching power source apparatus according to a related art.
Figure 2:
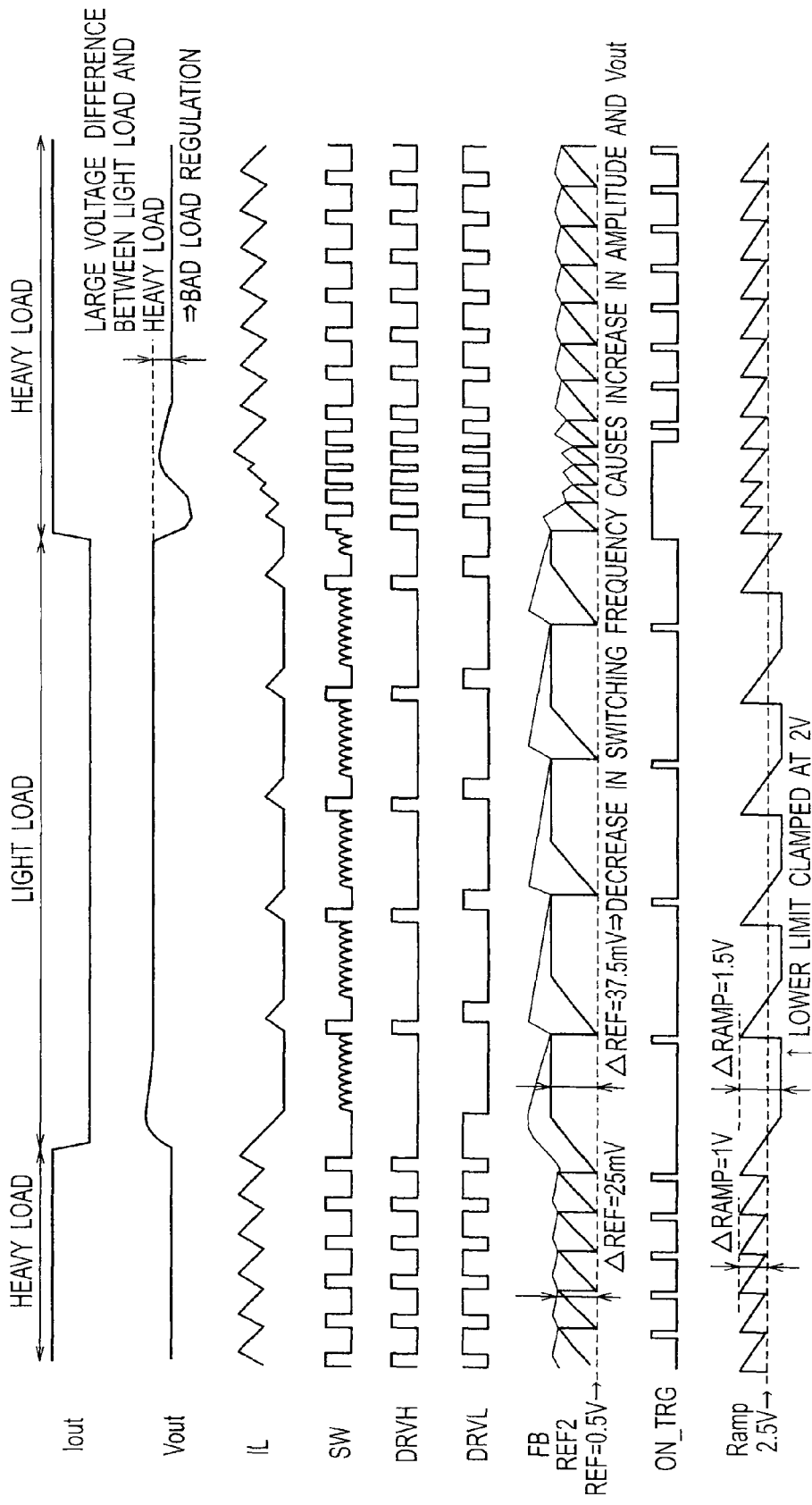
FIG. 2 is a timing chart illustrating operation of the switching power source apparatus of FIG. 1.

A switching power source apparatus according to Embodiment 1 of the present invention will be explained with reference to FIG. 3. Parts of FIG. 3 that are similar to those of the related art of FIG. 1 are represented with like reference numerals to avoid a repetition of explanation.

Figure 3:
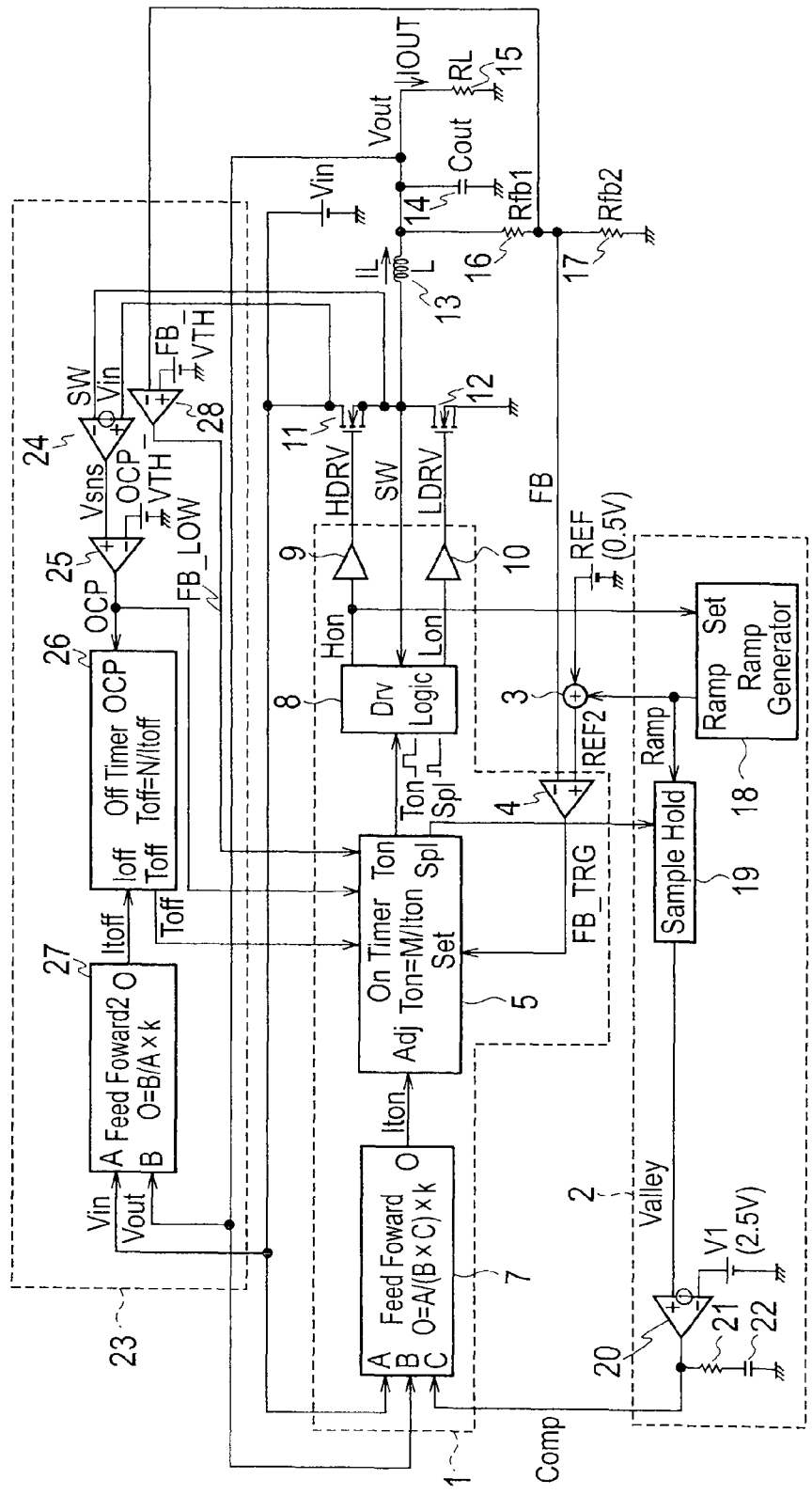
FIG. 3 is a circuit diagram illustrating a switching power source apparatus according to Embodiment 1 of the present invention.

In FIG. 3, the switching power source apparatus according to the present embodiment includes a first feedback controller 1, a second feedback controller 2, a superposing circuit 3, a high-side MOSFET 11, a low-side MOSFET 12, an inductor 13, an output smoothing capacitor 14, an output load 15, feedback res stars 16 and 17, and an overcurrent protection circuit 23.

The first feedback controller 1 includes a feedback comparator 4, a feedforward circuit 7, an ON timer 5, a drive logic 8, a high-side driver 9, and a low-side driver 10.

The second feedback controller 2 includes a ramp generator 18, a sample hold circuit 19, an error amplifier 20, a phase compensation resistor 21, and a phase compensation capacitor 22.

The switching power source apparatus of the present embodiment differs from the switching power source apparatus of the related art illustrated in FIG. 1 in that the apparatus of the present embodiment additionally has the second feedback controller 2 and overcurrent protection circuit 23.

The high-side MOSFET 11 corresponds to the high-side switch stipulated in the claims and is connected between an input voltage line Vin and the inductor 13. More precisely, a drain of the high-side MOSFET 11 is connected to the input voltage line Vin and a source thereof is connected to a drain of the low-side MOSFET 12 and through the inductor 13 to the output load 15. The switching power source apparatus according to the present embodiment carries out switching operation of the high- and low-side MOSFETs 11 and 12, to convert the input voltage Vin into a predetermined output voltage Vout supplied to the output load 15.

The first feedback controller 1 acts as a major loop to handle the output load 15 that dynamically changes. If the output load 15 suddenly changes from light to heavy, the first feedback controller 1 operates at once without using the error amplifier 20, to minimize a change in the output voltage Vout.

On the other hand, the second feedback controller 2 acts as a minor loop to detect an amplitude of a ramp signal Ramp generated by the ramp generator 18 and optimize an ON width of the high-side MOSFET 11 in such a way as to keep constant the amplitude of the ramp signal Ramp without regard to an output load current Iout. This results in keeping constant a switching frequency Fsw of the high-side MOSFET 11. With this control, the peak of a second reference voltage REF2 is always kept constant with respect to a static load variation, thereby remarkably improving the load regulation characteristic of the switching power source apparatus without sacrificing control stability. Consequently, the present embodiment solves the load regulation deteriorating problem of the related art.

Figure 4:
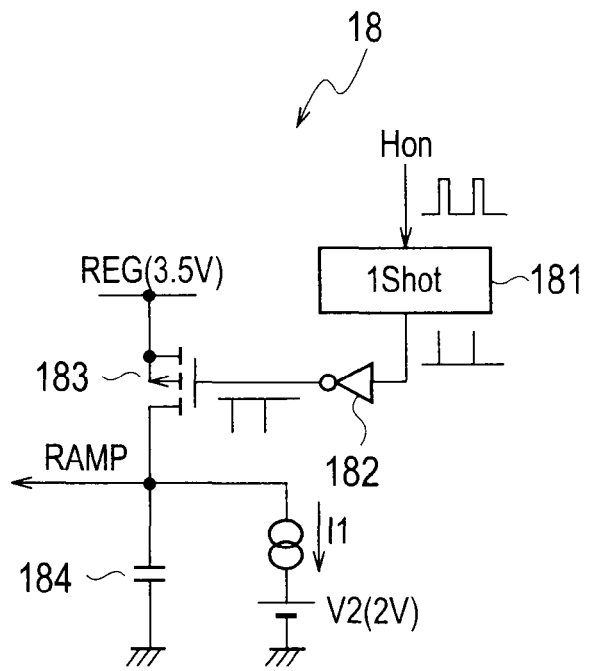
FIG. 4 is a circuit diagram illustrating a ramp generator arranged in the switching power source apparatus of FIG. 3.

The ramp generator 18 corresponds to the ramp signal generator stipulated in the claims and generates the ramp signal Ramp in synchronization with the switching frequency of the high-side MOSFET 11. FIG. 4 is a circuit diagram illustrating the details of the ramp generator 18. In FIG. 4, the ramp generator 18 includes a one-shot circuit 181, an inverter 182, a p-channel MOSFET 183, a capacitor 184, a constant current source I1, and a lower limit clamping voltage V2.

The one-shot circuit 181 receives a drive signal Hon from the high-side driver 9, and when the drive signal Hon changes to high, turns on the p-channel MOSFET 183 for a very short period such as about 100 ns, thereby charging the capacitor 184 to a power source voltage REG at once.

When the p-channel MOSFET 183 is turned off, the capacitor 184 is gradually discharged by the constant current source I1. As a result, the ramp generator 18 generates the ramp signal Ramp assuming a ripple signal by ESR and outputs the ramp signal Ramp to the superposing circuit 3 and sample hold circuit 19.

The superposing circuit 3 generates a second ramp signal having a positive inclination and corresponding to the amplitude and frequency of the ramp signal Ramp generated by the ramp generator 18 and superposes the second ramp signal on a first reference voltage REF (0.5 V), to generate a superposed signal REF2.

Figure 5:
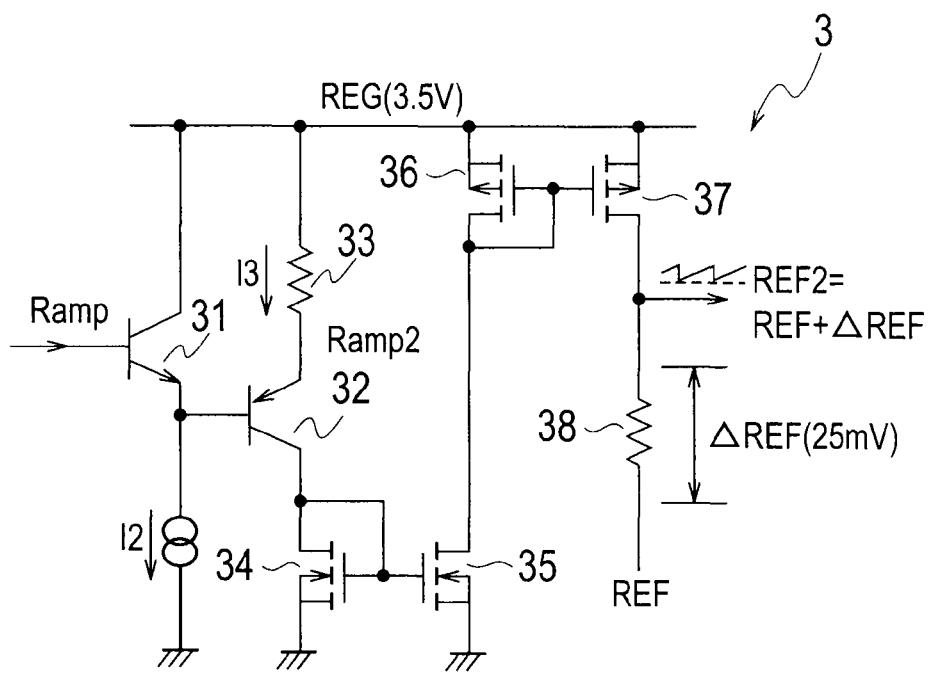
FIG. 5 is a circuit diagram illustrating a superposing circuit arranged in the switching power source apparatus of FIG. 3.

FIG. 5 is a circuit diagram illustrating the details of the superposing circuit 3. In FIG. 5, the superposing circuit 3 includes an npn transistor 31, a pnp transistor 32, a resistor 33, n-channel MOSFETs 34 and 35, p-channel MOSFETs 36 and 37, a resistor 38, and a constant current source 12.

The ramp signal Ramp generated by the ramp generator 18 is received by a buffer circuit of the npn transistor 31 and pnp transistor 32. The buffer circuit carries out impedance conversion on the ramp signal Ramp, so that an emitter of the pnp transistor 32 outputs the second ramp signal Ramp2 whose voltage level is substantially equal to that of the ramp signal Ramp. As a result, both ends of the resistor 33 cause a potential difference of (REG−Ramp2) to generate a current signal I3 corresponding to a change in the ramp signal Ramp. The current signal I3 is transmitted through a current mirror circuit of the n-channel MOSFETs 34 and 35 and a current mirror circuit of the p-channel MOSFETs 36 and 37 and is converted into a voltage by the resistor 38.

In this way, at a high-potential terminal of the resistor 38, the superposing circuit 3 superposes the second ramp signal Ramp2 having a positive inclination corresponding to the ramp signal Ramp on the first reference voltage REF that is a stable DC voltage, to generate the second reference voltage REF2 (corresponding to the superposed signal as stipulated in the claims), which is outputted to a positive input terminal of the feedback comparator 4.

The sample hold circuit 19, error amplifier 20, phase compensation resistor 21, and phase compensation capacitor 22 arranged in the second feedback controller 2 correspond to the amplitude signal generator as stipulated in the claims and generate an amplitude signal Comp corresponding to an amplitude of the ramp signal Ramp generated by the ramp generator 18.

Figure 6:
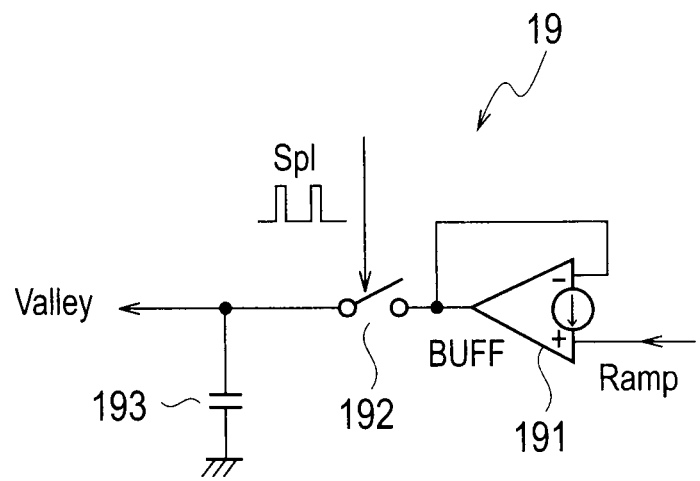
FIG. 6 is a circuit diagram illustrating a sample hold circuit arranged in the switching power source apparatus of FIG. 3.

The sample hold circuit 19 holds a valley voltage of the ramp signal Ramp generated by the ramp generator 18. FIG. 6 is a circuit diagram illustrating the details of the sample hold circuit 19. In FIG. 6, the sample hold circuit 19 includes a buffer circuit 191, a switch 192, and a capacitor 193.

The buffer circuit 191 outputs an impedance-converted signal of the ramp signal Ramp. When the ramp signal Ramp reaches a valley voltage Valley, the switch 192 turns on for a predetermined sampling period in response to a sampling signal Spl from the ON timer 5, to charge the capacitor 193. Accordingly, the capacitor 193 holds the valley voltage Valley of the ramp signal Ramp until the next sampling period.

The error amplifier 20 corresponds to the error amplifier as stipulated in the claims. The error amplifier 20 compares the valley voltage Valley held by the sample hold circuit 19 with a reference voltage V1, generates an error amplified signal according to a result of the comparison, and outputs the error amplified signal as the amplitude signal Comp. Namely, the error amplifier 20 compares the valley voltage Valley with the reference voltage V1 and outputs the amplitude signal Comp, which is phase-compensated by the resistor 21 and capacitor 22 and is sent to the feedforward circuit 7.

The first feedback controller 1 corresponds to the controller as stipulated in the claims. The first feedback controller 1 compares the superposed signal REF2 generated by the superposing circuit 3 with a feedback signal FB representative of the output voltage Vout, and if the feedback signal FB is lower than the superposed signal REF2, controls the ON timing of the high-side switch, i.e., the high-side MOSFET 11 so as to turn on the high-side switch. At the same time, the first feedback controller 1 controls an ON width of the high-side switch according to the amplitude signal Comp generated by the amplitude signal generator, the input voltage Vin, and the output voltage Vout.

Figure 7:
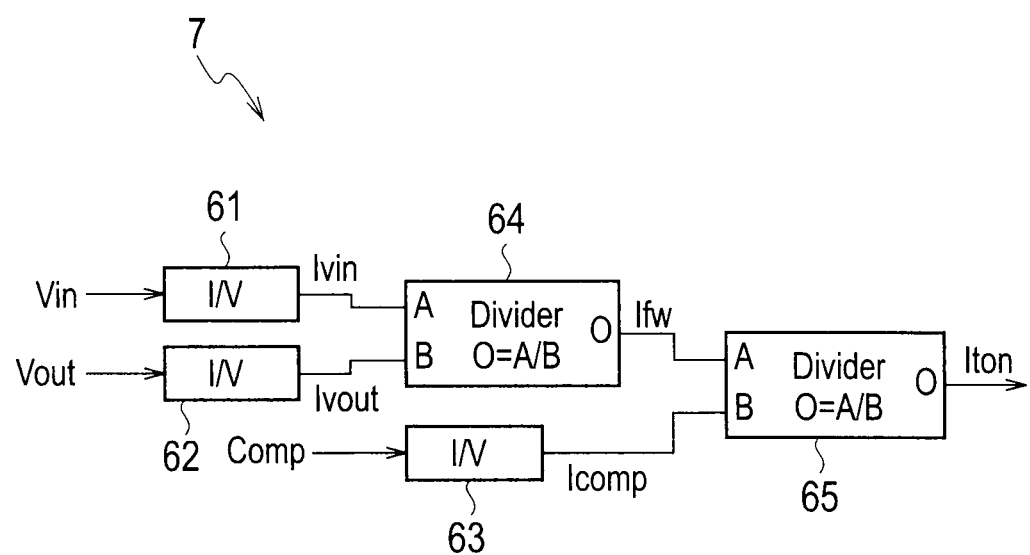
FIG. 7 is a circuit diagram illustrating a feedforward circuit arranged in the switching power source apparatus of FIG. 3.

FIG. 7 is a circuit diagram illustrating the details of the feedforward circuit 7. In FIG. 7, the feedforward circuit 7 includes voltage-current converters 61, 62, and 63 and dividers 64 and 65.

The voltage-current converter 61 converts the input voltage Vin into a current signal Ivin. The voltage-current converter 62 converts the output voltage Vout into a current signal Ivout.

The voltage current converter 63 converts the amplitude signal (error amplified voltage) Comp into a current signal Icomp.

The divider 64 divides the current signal Ivin by the current signal Ivout and outputs a current signal Ifw to the divider 65. The divider 65 divides the current signal Ifw by the current signal Icomp and outputs a current signal Iton according to a relationship of "Iton=K×Vin/(Vout×Comp)". Here, "K" is a conversion coefficient for converting the input voltage Vin, output voltage Vout, and amplitude signal Comp into the respective current signals and has a dimension inversely proportional to a resistance.

The feedforward circuit 7 outputs the output current Iton to a terminal Adj of the ON timer 5, the output current Iton being proportional to the input voltage Vin and inversely proportional to the output voltage Vout. With this operation of the feedforward circuit 7, the first feedback controller 1 controls the ON width of the high-side MOSFET 11 in such a way as to maintain the switching frequency of the high-side MOSFET 11 without regard to the input and output conditions. The output current Iton is inversely proportional to the amplitude signal (error amplified signal) Comp from the second feedback controller 2, and therefore, the first feedback controller 1 also controls the ON width of the high-side MOSFET 11 in such a way as to equalize the valley voltage Valley of the ramp signal Ramp with the reference voltage V1.

By virtue of the feedforward circuit 7, the first feedback controller 1 controls the ON width of the high-side MOSFET 11, i.e. the high-side switch, so that the amplitude of the ramp signal Ramp generated by the ramp generator 18 keeps a predetermined value according to the amplitude signal (error amplified signal) Comp outputted from the amplitude signal generator.

The feedback comparator 4 compares the feedback voltage FB with the second reference voltage REF2, and if the feedback voltage FB is lower than a peak of the second reference voltage REF2, outputs a signal FB_TRG to the ON timer 5. A voltage signal ΔREF superposed on the second reference voltage REF2 is kept constant irrespective of output load conditions by the feedback control that keeps constant the amplitude of the ramp signal Ramp. This realizes a good load regulation characteristic.

Figure 8:
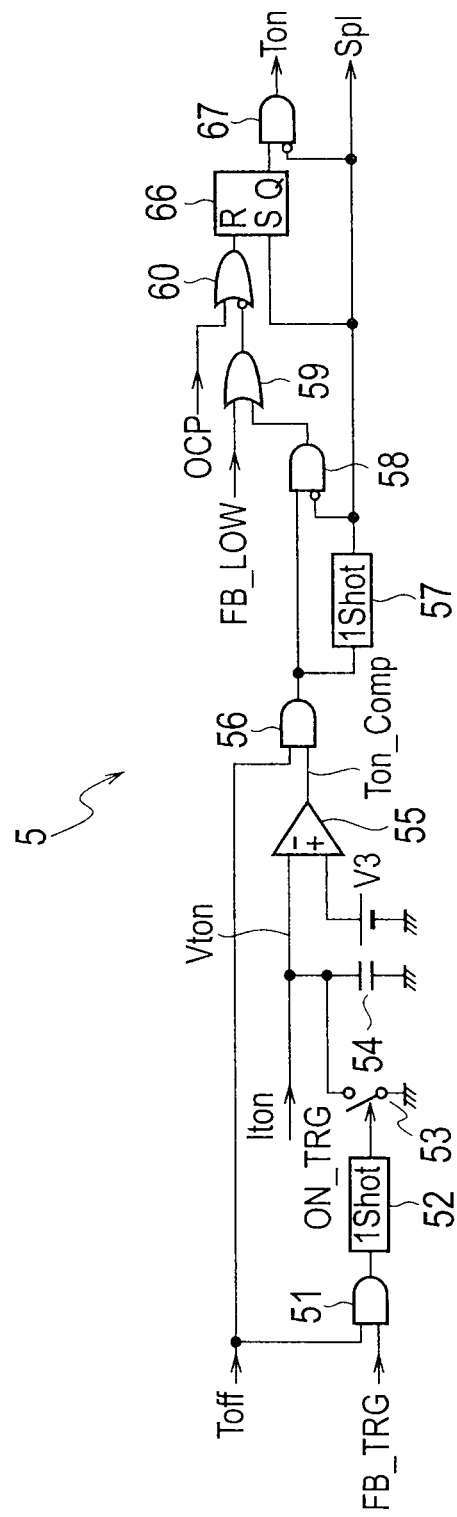
FIG. 8 is a circuit diagram illustrating an ON timer arranged in the switching power source apparatus of FIG. 3.

FIG. 8 is a circuit diagram illustrating the details of the ON timer 5. In FIG. 8, the ON timer 5 includes an AND gate 51, a one-shot circuit 52, a switch 53, a capacitor 54, a comparator 55, an AND gate 56, a one-shot circuit 57, an AND gate 58, OR gates 59 and 60, an SR flip-flop 66, and an AND gate 67.

The one-shot circuit 52 generates a signal ON_TRG having a predetermined time width when the signal FB_TRG from the feedback comparator 4 changes from low to high.

In response to the signal ON_TRG, the switch 53 turns on for the predetermined time. When the switch 53 turns on, the capacitor 54 discharges at once. As a result, the comparator 55 provides a logical output level of high and the one-shot circuit 57 outputs a sampling signal Spl having a predetermined period.

In the sampling period, the sampling signal Spl of high level is inputted to a set terminal of the SR flip-flop 66, and therefore, the SR flip-flop 66 outputs a high-level signal to the AND gate 67. When the sampling period set by the one-shot circuit 57 ends, the AND gate 67 makes an output signal, i.e., the drive logic control signal Ton high. Thereafter, the capacitor 54 is charged according to the feedforward current signal Iton. When the capacitor 54 reaches a threshold voltage V3, the comparator 55 provides a low-level output so that the AND gate 67 changes the drive logic control signal Ton to low.

Based on the drive logic control signal Ton from the ON timer 5, the drive logic 8 outputs the drive signal Hon for the high-side driver 9 and the drive signal Lon for the low-side driver 10, the drive signals Hon and Lon being in reverse phase. According to a voltage SW, the drive logic 8 detects that a regenerative period of the inductor 13 ends and the polarity of the current IL passing through the inductor 13 inverts, and then, changes the low-side drive signal Lon from high to low to turn off the low-side MOSFET 12. This prevents an excessive reverse flow of the inductor current IL and a useless loss.

According to the signal Hon from the drive logic 8, the high-side driver 9 drives the gate of the high-side MOSFET 11 to supply energy through the inductor 13 to the output capacitor 14 and output load 15.

According to the signal Lon from the drive logic 8, the low-side driver 10 drives the gate of the low-side MOSFET 12, to turn on the low-side MOSFET 12 in a regenerative period of the inductor current IL after the high-side MOSFET 11 is turned off, thereby reducing a conduction loss.

The overcurrent protection circuit 23 includes a current sense amplifier 24, an overcurrent detection comparator 25, an OFF timer 26, a second feedforward circuit 27, and an FB decrease detection comparator 28.

The current sense amplifier 24 generates, based on a drain-source potential difference of the high-side MOSFET 11 when the high-side MOSFET 11 is ON, a signal Vsns proportional to a drain current of the high-side MOSFET 11 and outputs the same to a positive input terminal of the overcurrent detection comparator 25.

The overcurrent detection comparator 25 compares the signal Vsns with a threshold value OCP_VTH, and if Vsns is higher than OCP_VTH, outputs an overcurrent detection signal OCP of high level to the ON timer 5 and OFF timer 26.

The current sense amplifier 24 and overcurrent detection comparator 25 correspond to the overcurrent detector as stipulated in the claims and detect if a current passing through the output load 15 is an overcurrent. More precisely, the current sense amplifier 24 and overcurrent detection comparator 25 serving as the overcurrent detector determine whether or not a current passing through the high-side MOSFET 11 is equal to or higher than the predetermined threshold value and thereby detects an overcurrent.

The second feedforward circuit 27 corresponds to the feedforward unit as stipulated in the claims and generates a feedforward current Itoff that is inversely proportional to the input voltage Vin and proportional to the output voltage Vout and outputs the same to the OFF timer 26.

Figure 9:
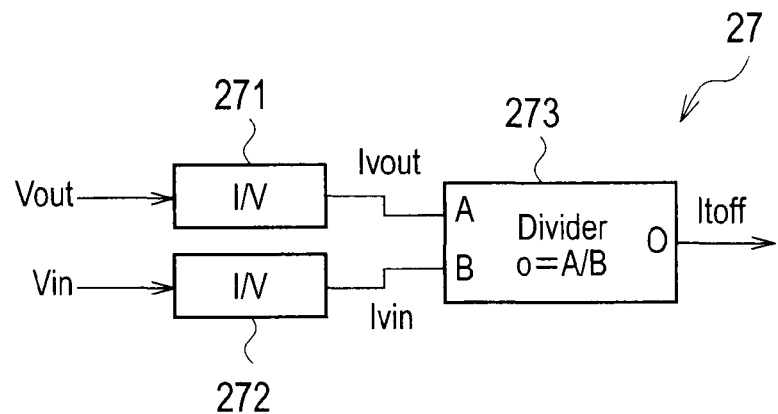
FIG. 9 is a circuit diagram illustrating a second feedforward circuit arranged in the switching power source apparatus of FIG. 3.

FIG. 9 is a circuit diagram illustrating the details of the second feedforward circuit 27. In FIG. 9, the second feedforward circuit 27 includes a combination of voltage-current converters 271 and 272 and a divider 273.

The voltage-current converter 272 converts the input voltage Vin into a current signal Ivin. The voltage-current converter 271 converts the output voltage Vout into a current signal Ivout.

The divider 273 divides the current signal Ivout by the current signal Ivin and outputs a current signal Itoff according to a relationship of "Itoff=Vout×K/Vin". Here, "K" is a conversion coefficient for converting the input voltage Vin and output voltage Vout into the respective current signals.

With this operation, the second feedforward circuit 27 decreases the current signal Itoff in response to a decrease in the output voltage Vout, thereby extending an OFF period of the high-side MOSFET 11 and decreasing the switching frequency thereof.

The OFF timer 26 determines, according to a detection result of the overcurrent detector, the input voltage Vin, and the output voltage Vout, a period for which the high-side MOSFET 11 is forcibly turned off and generates a forcible OFF signal Toff according to the determined period. According to the present embodiment, the OFF timer 26 does not directly handle the input voltage Vin and output voltage Vout. Instead, based on the feedforward current Itoff generated by the second feedforward circuit 27 and a detection result of the overcurrent detector, the OFF timer 26 determines the period during which the high-side MOSFET 11 must be turned off and generates the forcible OFF signal Toff according to the determined period.

Figure 10:
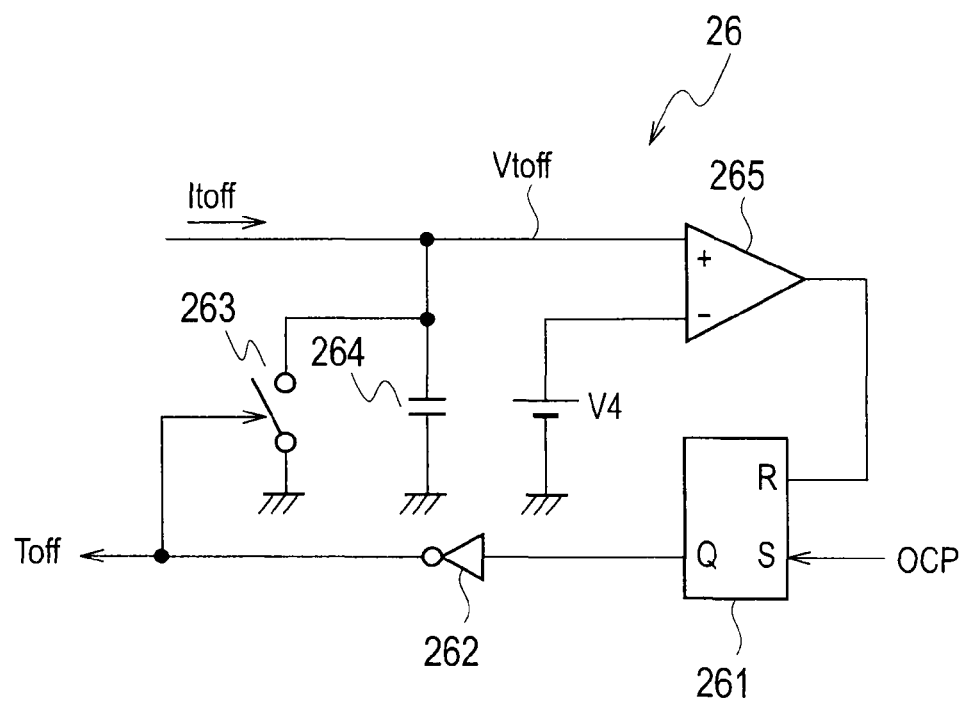
FIG. 10 is a circuit diagram illustrating an OFF timer arranged in the switching power source apparatus of FIG. 3.

FIG. 10 is a circuit diagram illustrating the details of the OFF timer 26 arranged in the switching power source apparatus according to the present embodiment. In FIG. 10, the OFF timer 26 includes an SR flip-flop 261, an inverter 262, a switch 263, a capacitor 264, and a comparator 265.

When receiving the overcurrent detection signal OCP of high level from the overcurrent detector, the OFF timer 26 sets the SR flip-flop 261, and through the inverter 262, changes the logical level of the forcible OFF signal Toff from high to low. The signal Toff is supplied to the ON timer 5, and at the same time, turns off the switch 263.

Thereafter, the current Itoff supplied from the second feedforward circuit 27 charges the capacitor 264. When a voltage Vtoff of the capacitor 264 exceeds a reference voltage V4, the comparator 265 changes its output level from low to high to reset the SR flip-flop 261. This results in changing the forcible OFF signal Toff from low to high to turn on the switch 263.

When the overcurrent detector detects an overcurrent, the first feedback controller 1 turns off the high-side MOSFET 11, and according to the forcible OFF signal Toff generated by the OFF timer 26, forcibly turns off the high-side MOSFET 11 for the period determined by the OFF timer 26.

In more detail, when receiving an overcurrent detection signal OCP of high level, the ON timer 5 illustrated in FIG. 8 in the first feedback controller 1 resets the SR flip-flop 66 through the OR gate 60, to immediately change the drive logic control signal Ton from high to low, thereby realizing overcurrent protection.

During the period in which the forcible OFF signal Toff is low in the overcurrent state, the AND gates 51 and 56 of the ON timer 5 prevent the sampling signal Spl from being outputted, and at the same time, prevent the drive logic control signal Ton from being transferred to the drive logic circuit 8. This results in preventing the high-side MOSFET 11 from being turned on during the overcurrent detected state.

During a period in which the overcurrent decreases the output voltage Vout, the feedforward circuit 7 must not function to narrow the ON width of the high-side MOSFET 11. For this, the FB decrease detection comparator 28 monitors the feedback voltage FB, and if the feedback voltage FB decreases to or below a reference voltage FB_VTH, outputs a signal FB_LOW of high level to the ON timer 5. The signal FB_LOW of high level makes the OR gate 59 in the ON timer 5 provide a high-level output to prevent the SR flip-flop 66 from being reset by any signal except the overcurrent detection signal OCP.

Figure 11:
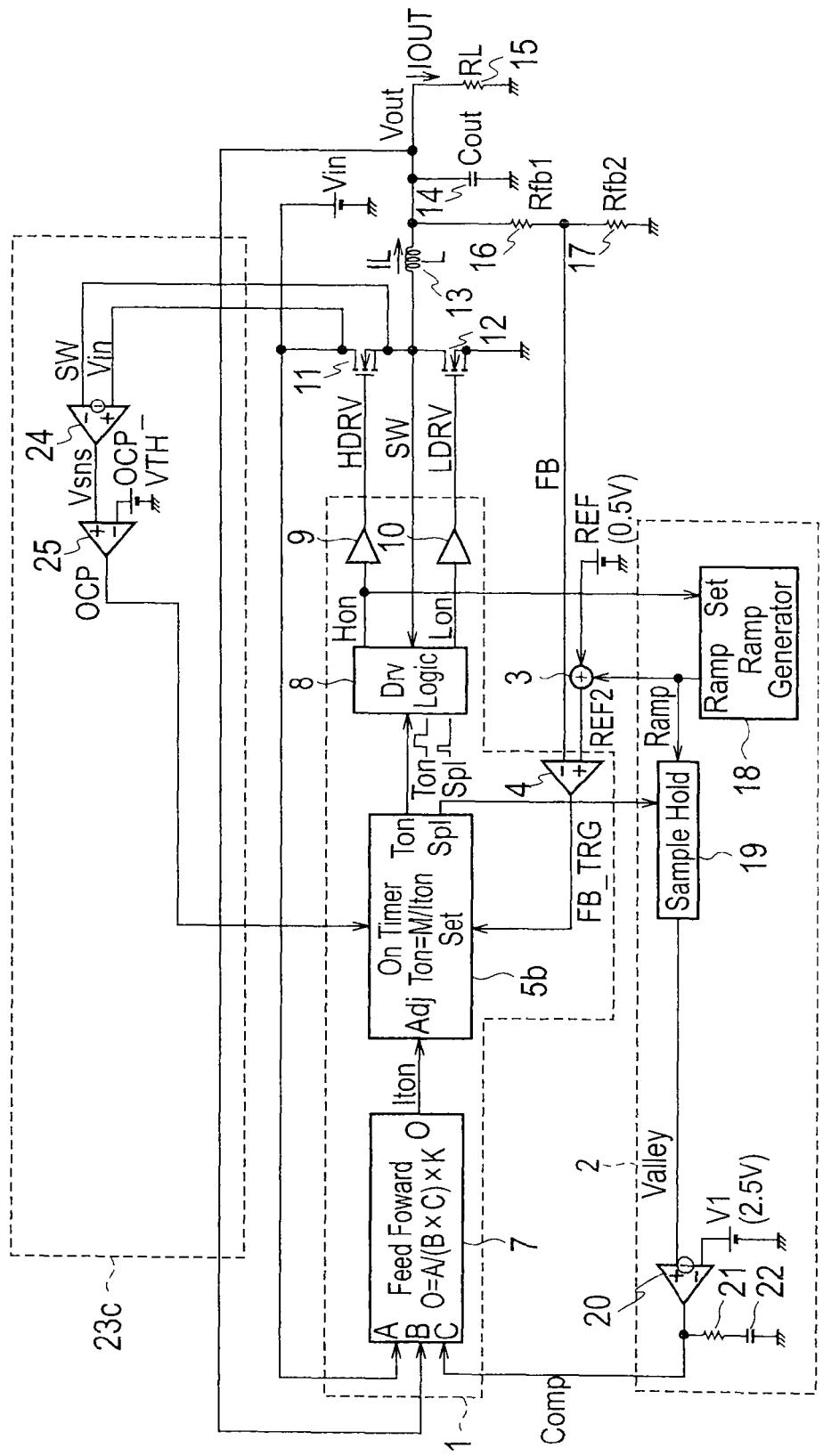
FIG. 11 is a circuit diagram illustrating the switching power source apparatus of Embodiment 1 provided with a conventional overcurrent protection circuit.

Operation of Embodiment 1 will be explained. In particular, operation of the overcurrent protection circuit 23 according to the present embodiment will be explained comprehensively by comparing it with an overcurrent protection circuit according to a related art. FIG. 11 is a circuit diagram illustrating the switching power source apparatus of the present embodiment provided with a conventional overcurrent protection circuit 23c instead of the overcurrent protection circuit 23 of the present embodiment illustrated in FIG. 3. The conventional overcurrent protection circuit 23c differs from the overcurrent protection circuit 23 of the present embodiment in that the circuit 23c is not provided with the OFF timer 26, second feedforward circuit 27, and FB decrease detection comparator 28 of the present embodiment.

Figure 12:
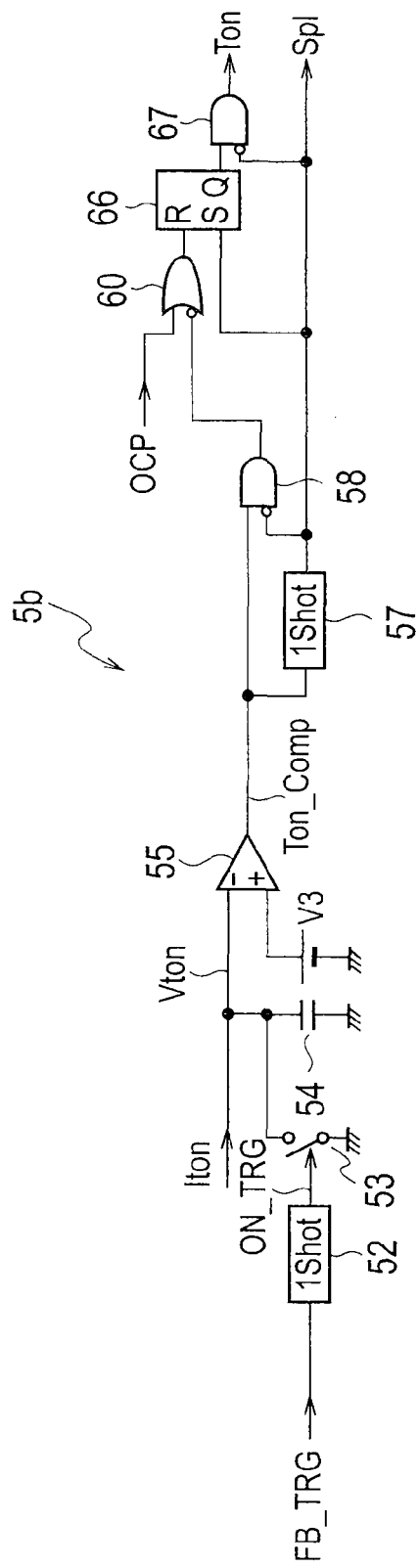
FIG. 12 is a circuit diagram illustrating an ON timer arranged in the switching power source apparatus of FIG. 11.

In addition, the first feedback controller 1 illustrated in FIG. 11 employs an ON timer 5b that differs from the ON timer 5 of the present embodiment illustrated in FIGS. 3 and 8. FIG. 12 is a circuit diagram illustrating the details of the ON timer 5b operating with the overcurrent protection circuit 23c in the switching power source apparatus of FIG. 11. In FIG. 12, the ON timer 5b includes a one-shot circuit 52, a switch 53, a capacitor 54, a comparator 55, a one-shot circuit 57, an AND gate 58, an OR gate 60, an SR flip-flop 66, and an AND gate 67. The ON timer 5b differs from the ON timer 5 of FIG. 8 in that the ON timer 5b does not have the AND gates 51 and 56 and OR gate 59.

A mechanism of greatly improving the load regulation characteristic of the switching power source apparatus of FIG. 11 by controlling the amplitude of a ramp signal to a constant value will be explained with reference to FIG. 13.

Figure 13:
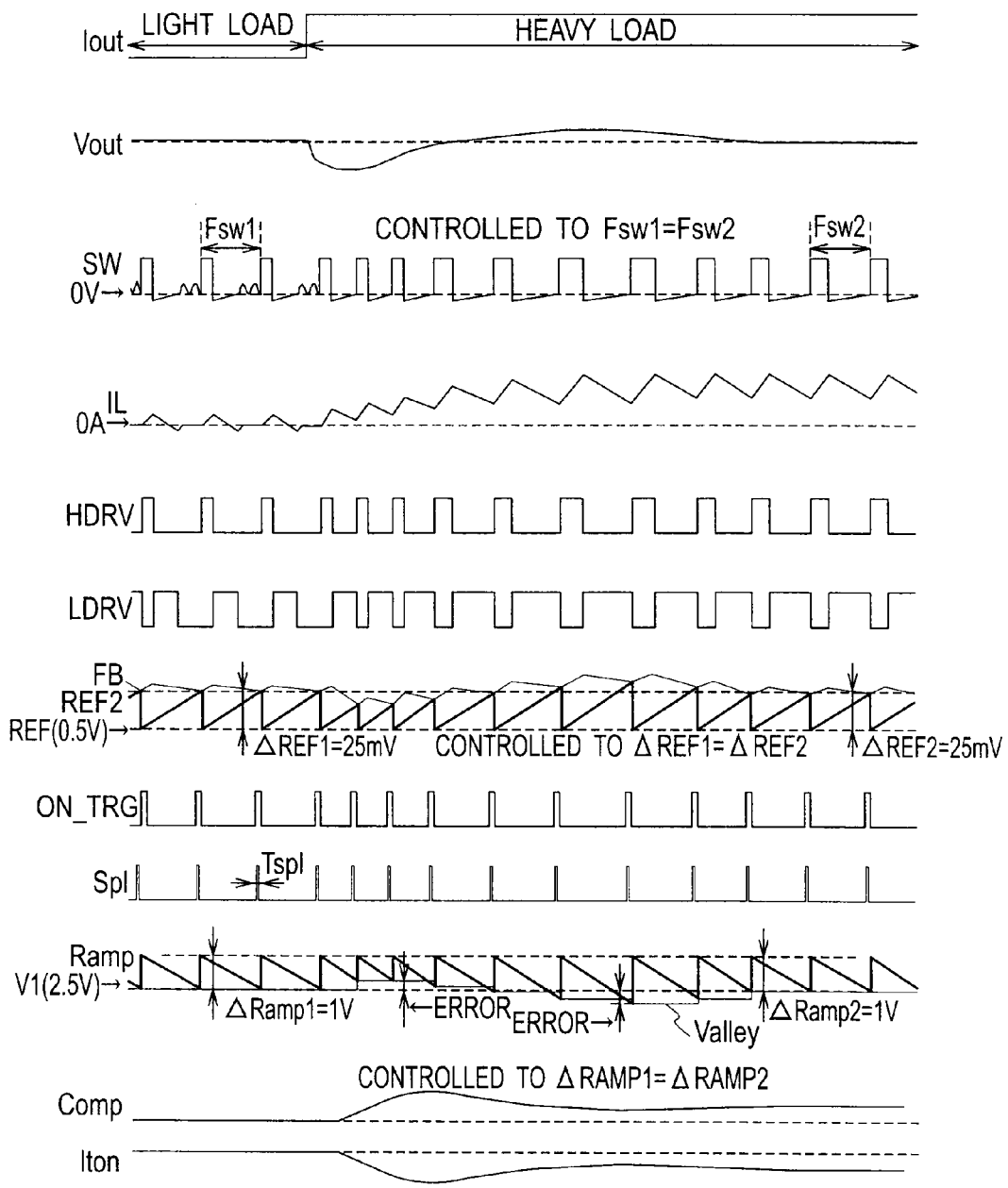
FIG. 13 is a timing chart illustrating operation of the switching power source apparatus of FIG. 3.

FIG. 13 is a timing chart illustrating operation of the switching power source apparatus of FIG. 11. When the output load current Iout passing through the output load 15 is in a steady light load state, the sample hold circuit 19, error amplifier 20, and feedforward circuit 7 operate to equalize a valley voltage Valley of the ramp signal Ramp with the reference voltage V1.

When the output load current Iout suddenly changes to a heavy load state, the output voltage Vout applied to the output load 15 decreases to decrease the feedback voltage FB. When the feedback voltage FB becomes equal to or lower than the second reference voltage REF2, the one-shot circuit 52 in the ON timer 5b outputs the signal ON_TRG according to a comparison result from the feedback comparator 4. In response to the signal ON_TRG, the high-side MOSFET 11 is turned on at once. At this time, the valley voltage Valley of the ramp signal Ramp increases to produce an error with respect to the reference voltage V1.

To cancel the error, the error amplifier 20 in the second feedback controller 2 increases the amplitude signal Comp. In inversely proportional to the increase in the amplitude signal Comp, the feedforward current Iton from the feedforward circuit 7 decreases. Due to the decrease in the feedforward signal Iton, the ON timer 5b widens the width of the signal Ton.

As a result, the first feedback controller 1 widens the ON width of the high-side MOSFET 11. Namely, based on the amplitude signal Comp from the amplitude signal generator, the first feedback controller 1 widens the ON width of the high-side switch, i.e., the high-side MOSFET 11 if the amplitude of the ramp signal Ramp generated by the ramp generator 18 is lower than a predetermined value.

When the ON width of the high-side MOSFET 11 is widened, the switching frequency thereof decreases to maintain an ON duty that is substantially determined by a ratio of the input voltage Vin to the output voltage Vout. Consequently, a switching frequency Fsw1 under light load and a switching frequency Fsw2 under heavy load of the high-side MOSFET 11 are equalized to each other. This results in equalizing the valley voltage Valley of the ramp signal Ramp with the reference voltage V1, and therefore, the amplitude of ΔREF superposed on the second reference voltage REF2 is controlled to be constant (e.g. ΔREF1=ΔREF2 in FIG. 13) without regard to the load current Iout.

When the feedback voltage FB increases and the valley voltage Valley of the ramp signal Ramp decreases to create an error between the valley voltage Valley and the reference voltage V1, the error amplifier 20 in the second feedback controller 2 decreases the amplitude signal Comp to cancel the error. As a result, the first feedback controller 1 narrows the ON width of the high-side MOSFET 11. Namely, according to the amplitude signal Comp from the amplitude signal generator, the first feedback controller 1 narrows the ON width of the high-side switch, i.e., the high-side MOSFET 11 if the amplitude of the ramp signal Ramp from the ramp generator 18 is equal to or higher than the predetermined value.

When the ON width of the high-side MOSFET 11 is narrowed, the switching frequency thereof increases to equalize the switching frequency Fsw1 under light load with the switching frequency Fsw2 under heavy load of the high-side MOSFET 11. This results in equalizing the valley voltage Valley of the ramp signal Ramp with the reference voltage V1, and therefore, the amplitude of ΔREF superposed on the second reference voltage REF2 is controlled to be constant without regard to the load current Iout.

In this way, for a dynamic load variation, the first feedback controller 1, i.e., a major loop quickly responds without using the error amplifier 20, to minimize a change in the output voltage Vout. On the other hand, for a static load variation, the error amplifier 20 is used to keep the amplitude of the ramp signal Ramp at a constant value. As a result, the switching power source apparatus of FIG. 11 greatly improves the load regulation characteristic thereof without sacrificing control stability, thereby solving the load regulation problem of the related art.

An overcurrent protection operation of the switching power source apparatus of FIG. 11 provided with the conventional overcurrent protection circuit 23c will be explained. The overcurrent protection circuit 23c includes a current sense amplifier 24 and an overcurrent detection comparator 25. The current sense amplifier 24 generates, based on a drain-source potential difference of the high-side MOSFET 11 when the high-side MOSFET 11 is ON, a signal Vsns proportional to a drain current of the high-side MOSFET 11 and outputs the same to a positive input terminal of the overcurrent detection comparator 25.

The overcurrent detection comparator 25 compares the signal Vsns with a threshold value OCP_VTH, and if Vsns is higher than OCP_VTH, outputs an overcurrent detection signal OCP of high level to the ON timer 5b.

The ON timer 5b of FIG. 12 in the first feedback controller 1 receives the high-level overcurrent detection signal OCP, resets the SR flip-flop 66 through the OR gate 60, and instantly changes the drive logic control signal Ton from high to low, thereby realizing overcurrent protection.

Figure 14:
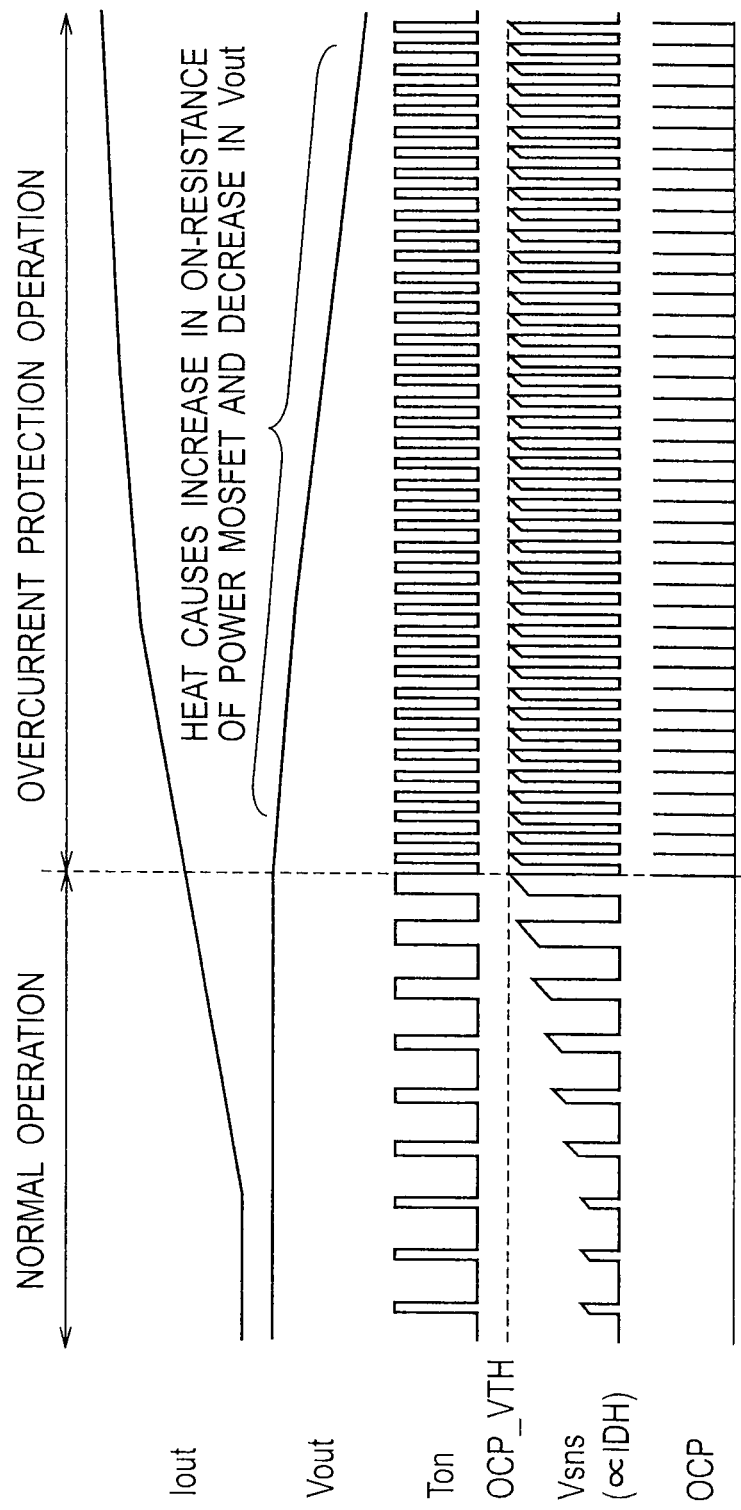
FIG. 14 is a timing chart illustrating operation in an overcurrent state of the switching power source apparatus of FIG. 11 provided with the general overcurrent protection circuit.

The switching power source apparatus off FIG. 11 provided with the conventional overcurrent protection circuit 23c carries out overcurrent protection by immediately turning off the high-side MOSFET 11 if an overcurrent is detected. Thereafter, the output voltage Vout decreases, and when the feedback voltage FB decreases to the second reference voltage REF2, the apparatus of FIG. 11 again turns on the high-side MOSFET 11. FIG. 14 is a timing chart illustrating operation in an overcurrent state of the apparatus of FIG. 11. As mentioned above, the high-side MOSFET 11 repeats ON/OFF operation in an overcurrent state and an OFF period of the high-side MOSFET 11 shortens as illustrated in FIG. 14 to widen an ON duty. As a result, the output voltage Vout causes substantially no decrease and heat is generated to increase the ON resistance of the power MOSFET 11, and in the worst case, break the power MOSFET 11.

To prevent such an inconvenience, the overcurrent protection circuit 23 of the present embodiment illustrated in FIG. 3 forcibly turns off the high-side MOSFET 11 as an overcurrent is detected, and at the same time, enables the OFF timer 26 to generate the forcible OFF signal Toff to prohibit the high-side MOSFET 11 from being turned on for a predetermined period.

The forcible OFF period specified by the forcible OFF signal Toff is controlled according to the current signal Itoff provided by the second feedforward circuit 27. The second feedforward circuit 27 and OFF timer 26 operate to widen the forcible OFF period as the output voltage Vout decreases. Since the switching frequency of the high-side MOSFET 11 decreases as the output voltage Vout decreases, the overcurrent protection circuit 23 realizes an ideal overcurrent protection characteristic.

Figure 15:
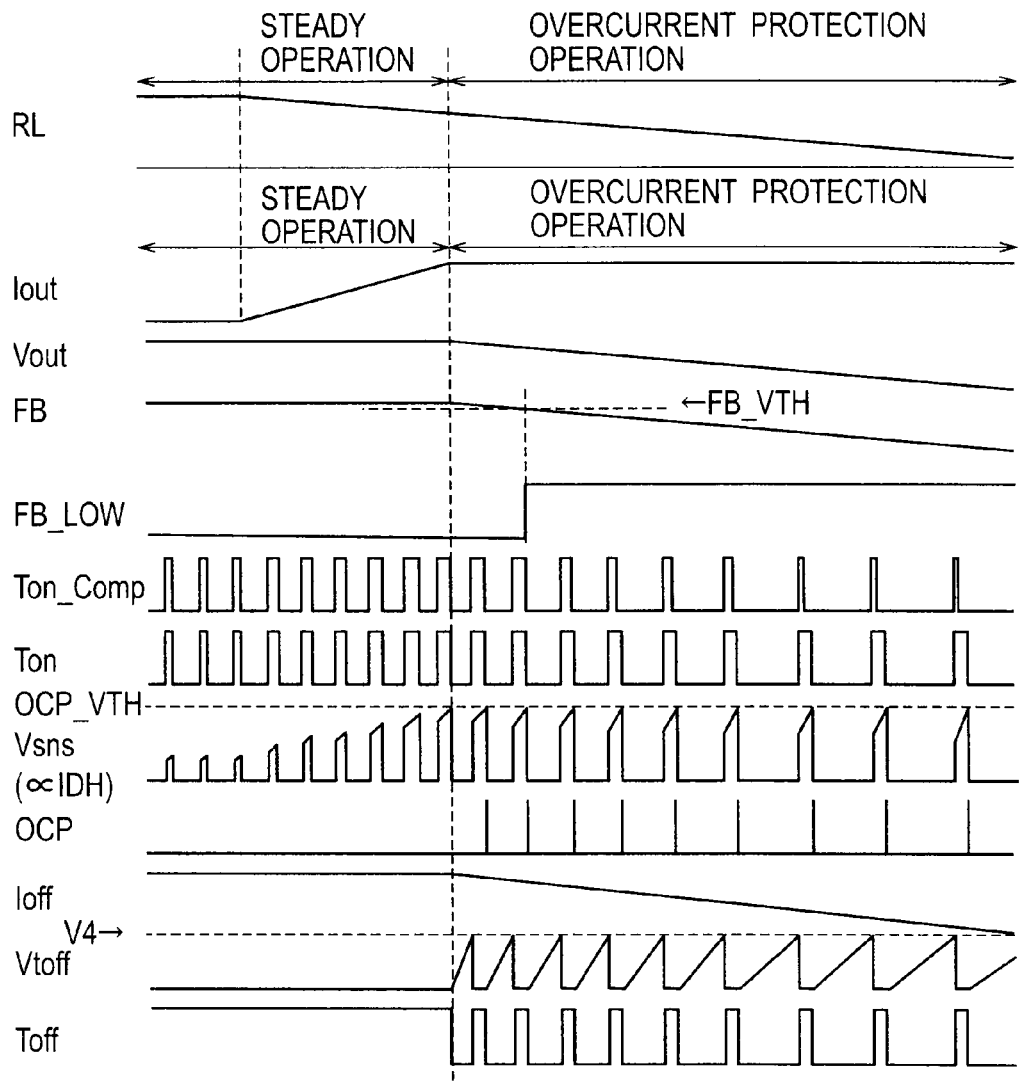
FIG. 15 is a timing chart illustrating operation in an overcurrent state of the switching power source apparatus of FIG. 3 provided with the overcurrent protection circuit of Embodiment 1.

FIG. 15 is a timing chart illustrating operation in an overcurrent state of the switching power source apparatus provided with the overcurrent protection circuit 23 according to the present embodiment. With reference to FIG. 15, operation in an overcurrent. state of the overcurrent protection circuit 23 according to the present embodiment will be explained in detail. First, the current sense amplifier 24 generates, based on a drain-source potential difference of the high-side MOSFET 11 when the high-side MOSFET 11 is ON, a signal Vsns proportional to a drain current of the high-side MOSFET 11 and outputs the same to the positive input terminal of the overcurrent detection comparator 25. The overcurrent detection comparator 25 compares the signal Vsns with the threshold value OCP_VTH, and if Vsns is higher than OCP_VTH, carries out "Overcurrent protection operation" illustrated in FIG. 15 to output an overcurrent detection signal OCP of high level to the ON timer 5 and OFF timer 26.

When receiving the overcurrent detection signal OCP of high level, the ON timer 5 resets the SR flip-flop 66 through the OR gate 60, to instantaneously change the drive logic control signal Ton from high to low. With this, the switching power source apparatus of the present embodiment realizes overcurrent protection.

At this time, the second feedforward circuit 27 generates the feedforward current Itoff that is inversely proportional to the input voltage Vin and proportional to the output voltage Vout and outputs the same to the OFF timer 26.

When receiving the high-level overcurrent detection signal OCP, the OFF timer 26 sets the SR flip-flop 261, and through the inverter 262, changes the Logical level of the forcible OFF signal Toff from high to low. The signal Toff is supplied to the ON timer 5, and at the same time, turns off the switch 263. Thereafter, the current Itoff supplied from the second feedforward circuit 27 charges the capacitor 264. When the voltage Vtoff of the capacitor 264 exceeds the reference voltage V4, the comparator 265 changes its output level from low to high to reset the SR flip-flop 261. This results in changing the forcible OFF signal Toff from low to high to turn on the switch 263.

During the period in which the forcible OFF signal Toff is low in the overcurrent state, the AND gates 51 and 56 of the ON timer 5 prevent the sampling signal Spl from being outputted, and at the same time, prevent the drive logic control signal Ton from being transferred to the drive logic circuit 8. This results in preventing the high-side MOSFET 11 from being turned on during the overcurrent detected state.

During a period in which the overcurrent decreases the output voltage Vout, the feedforward circuit 7 must not function to narrow the ON width of the high-side MOSFET 11.

For this, the FB decrease detection comparator 28 monitors the feedback voltage FB, and if the feedback voltage FB decreases to or below the reference voltage FB_VTH, outputs a signal FB_LOW of high level to the ON timer 5. The signal FB_LOW of high level makes the OR gate 59 in the ON timer 5 provide a high-level output to prevent the SR flip-flop 66 from being reset by any signal except the overcurrent detection signal OCP.

With the above-mentioned operation, the switching power source apparatus of the present embodiment turns off the high-side MOSFET 11 as the output load current Iout increases to an overcurrent state. At the same time, the apparatus enables the OFF timer 26 to insert the forcible OFF period specified by the forcible OFF signal Toff to prevent the ON duty of the high-side MOSFET 11 from increasing. In addition, the overcurrent protection circuit 23 keeps the ON width of the high-side MOSFET 11 at a constant value and extends the forcible OFF period in inverse proportion to a decrease in the output voltage Vout, thereby narrowing the ON duty of the high-side MOSFET 11.

Figure 16:
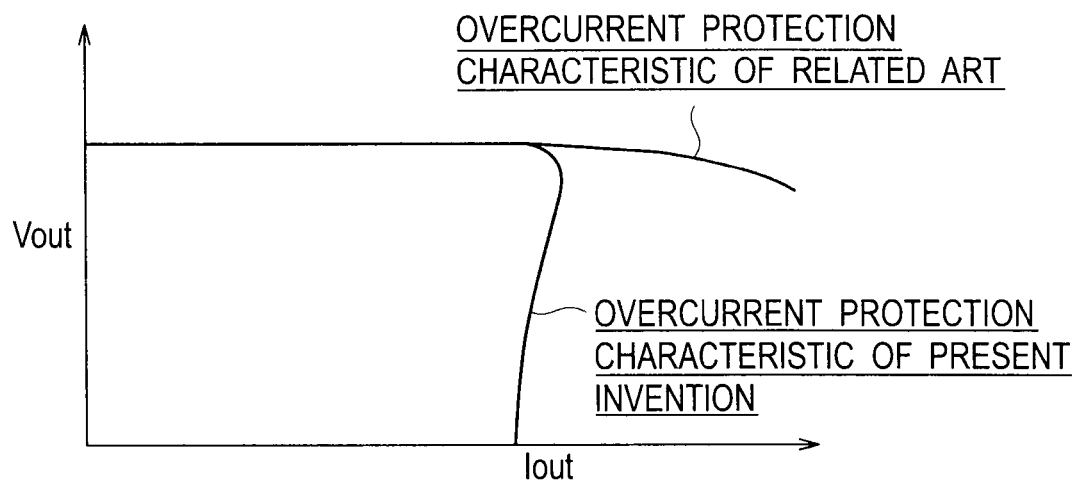
FIG. 16 is a graph illustrating overcurrent protection characteristics of the present invention and related art.

FIG. 16 is a view illustrating an overcurrent protection characteristic of the switching power source apparatuses provided with the overcurrent protection circuit 23 according to the present embodiment and that of the switching power source apparatus provided with the conventional overcurrent protection circuit 23c. The overcurrent protection circuit 23c operates to shorten an OFF period in an overcurrent state, thereby increasing the ON duty of the high-side MOSFET 11 and not decreasing the output voltage Vout in principle. When the output load current Iout increases, heat is generated to increase the ON resistance of the power MOSFET (high-side MOSFET 11), to gradually decrease the output voltage Vout, and in the worst case, break the power MOSFET. On the other hand, the overcurrent protection circuit 23 of the present embodiment realizes an ideal drooping characteristic to prevent breakage of the power MOSFET.

In this way, the switching power source apparatus according to Embodiment 1 realizes a proper overcurrent protection characteristic, stably operates even with an output capacitor having a small ESR, and provides a good load regulation characteristic.

In particular, the switching power source apparatus according to Embodiment 1 inserts the forcible OFF period specified by the forcible OFF signal Toff in an overcurrent state, to prevent the ON duty of the high-side MOSFET 11 from increasing. In addition, the apparatus extends the forcible OFF period in inverse proportion to a decrease in the output voltage Vout, thereby narrowing the ON duty of the high-side MOSFET 11. Namely, the apparatus of Embodiment 1 decreases the switching frequency of the high-side MOSFET 11 as the output voltage Vout decreases, thereby realizing an ideal drooping characteristic for overcurrent protection and preventing the power MOSFET (high-side MOSFET 11) from increasing its ON resistance and from being broken due to heat generation.

Embodiment 2

Figure 17:
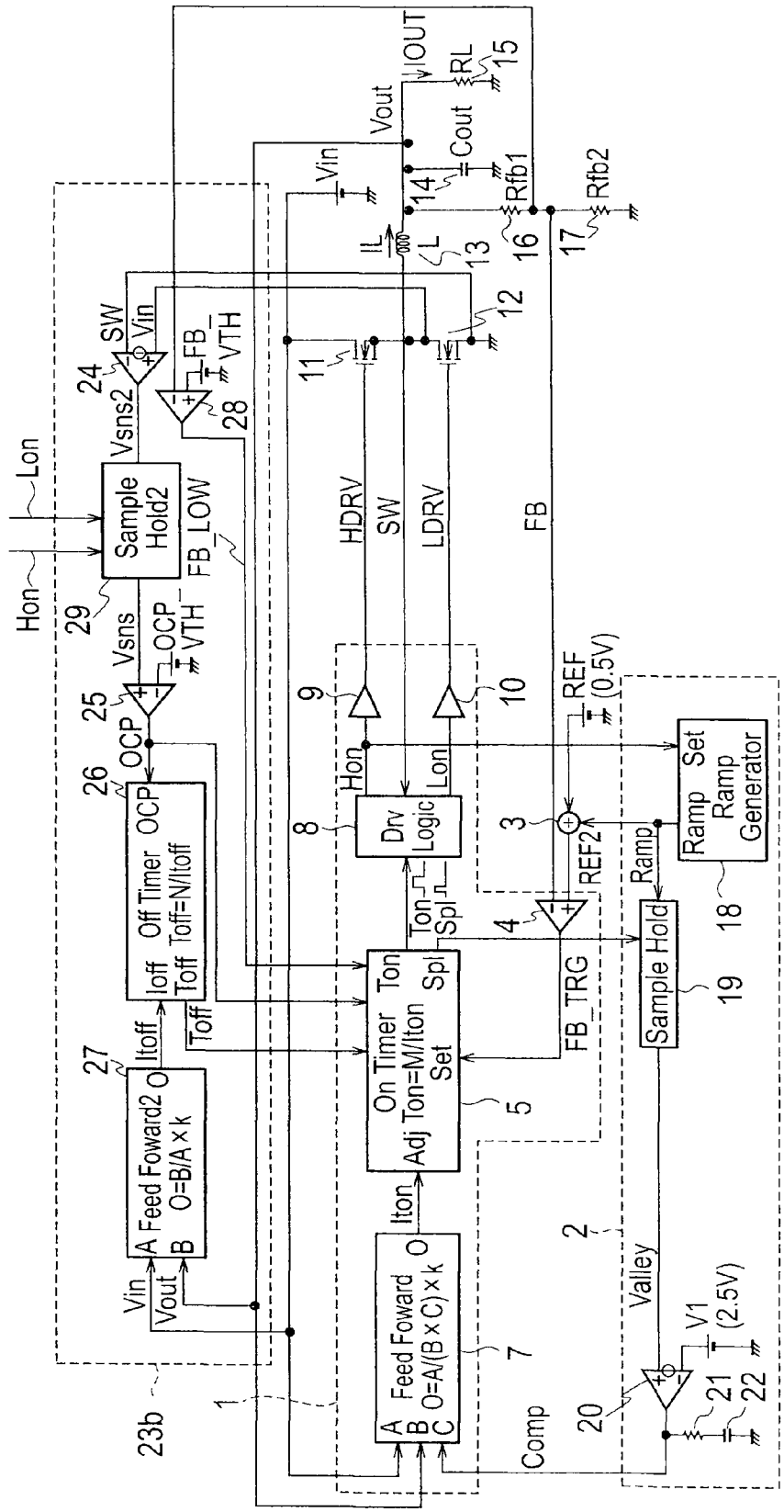
FIG. 17 is a circuit diagram illustrating a switching power source apparatus according to Embodiment 2 of the present invention.

FIG. 17 is a circuit diagram illustrating a switching power source apparatus according to Embodiment 2 of the present invention. Embodiment 2 differs from Embodiment 1 illustrated in FIG. 3 in that Embodiment 2 employs an overcurrent protection circuit 23b instead of the overcurrent protection circuit 23. The remaining part of Embodiment 2 is the same as that of Embodiment 1. In the overcurrent protection circuit 23b of the present embodiment, input terminals of a current sense amplifier 24 are connected to the drain and source of the low-side MOSFET 12 instead of those of the high-side MOSFET 11 and there is additionally arranged a second sample hold circuit 29. The low-side MOSFET 12 corresponds to the low-side switch as stipulated in the claims and is connected between the inductor 13 and the ground.

The current sense amplifier 24 generates, based on a drain-source potential difference of the low-side MOSFET 12 just after the low-side MOSFET 12 turns on, a signal Vsns2 proportional to a drain current of the low-side MOSFET 12 and outputs the same to the second sample hold circuit 29.

Figure 18:
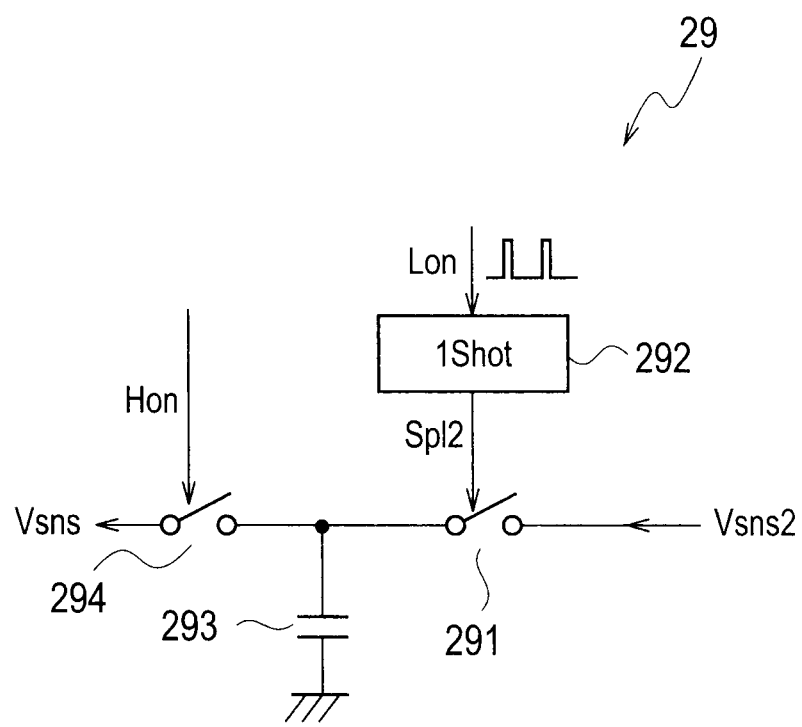

FIG. 18 is a circuit diagram illustrating the details of the second sample hold circuit 29 in the switching power source apparatus according to the present embodiment. In FIG. 18, the second sample hold circuit 29 includes a switch 291, a one-shot circuit 292, a capacitor 293, and a switch 294.

When a drive signal Lon for the low-side driver 10 changes from low to high, the one-shot circuit 292 outputs a sampling signal Spl2 to turn on the switch 291 for a predetermined period. As a result, the second sample hold circuit 29 generates a signal. Vsns proportional to a drain current of the low-side MOSFET 12 to charge the capacitor 293 to sample and hold a peak value.

Thereafter, a high-side drive signal Hon changes from low to high, to turn on the switch 294. As a result, the second sample hold circuit 29 outputs the signal Vsns to an overcurrent detection comparator 25.

The overcurrent detection comparator 25 compares the signal Vsns with a threshold value OCP_VTH, and if Vsns is higher than OCP_VTH, outputs an overcurrent detection signal OCP of high level to the ON timer 5 and an OFF timer 26.

Like Embodiment 1, the current sense amplifier 24, overcurrent detection comparator 25, and sample hold circuit 29 of Embodiment 2 correspond to the overcurrent detector as stipulated in the claims and detect if a current passing through the low-side MOSFET 12 is equal to or higher than the predetermined threshold value, thereby detecting an overcurrent.

Namely, the overcurrent detector samples and holds a low-side-switch current signal corresponding to a current passing through the low-side MOSFET 12 during an ON period of the low-side MOSFET 12, and according to the low-side-switch current signal, detects an overcurrent in an ON period of the high-side MOSFET 11.

The remaining configuration of Embodiment 2 is the same as that of Embodiment 1, and therefore, a repetition of explanation will be omitted.

Operation of Embodiment 2 having the above-mentioned configuration will be explained. Operation of the present embodiment is basically the same as that of Embodiment 1 except that the present embodiment detects an overcurrent according a drain current of the low-side MOSFET 12 instead of that of the high-side MOSFET 11.

Figure 19:
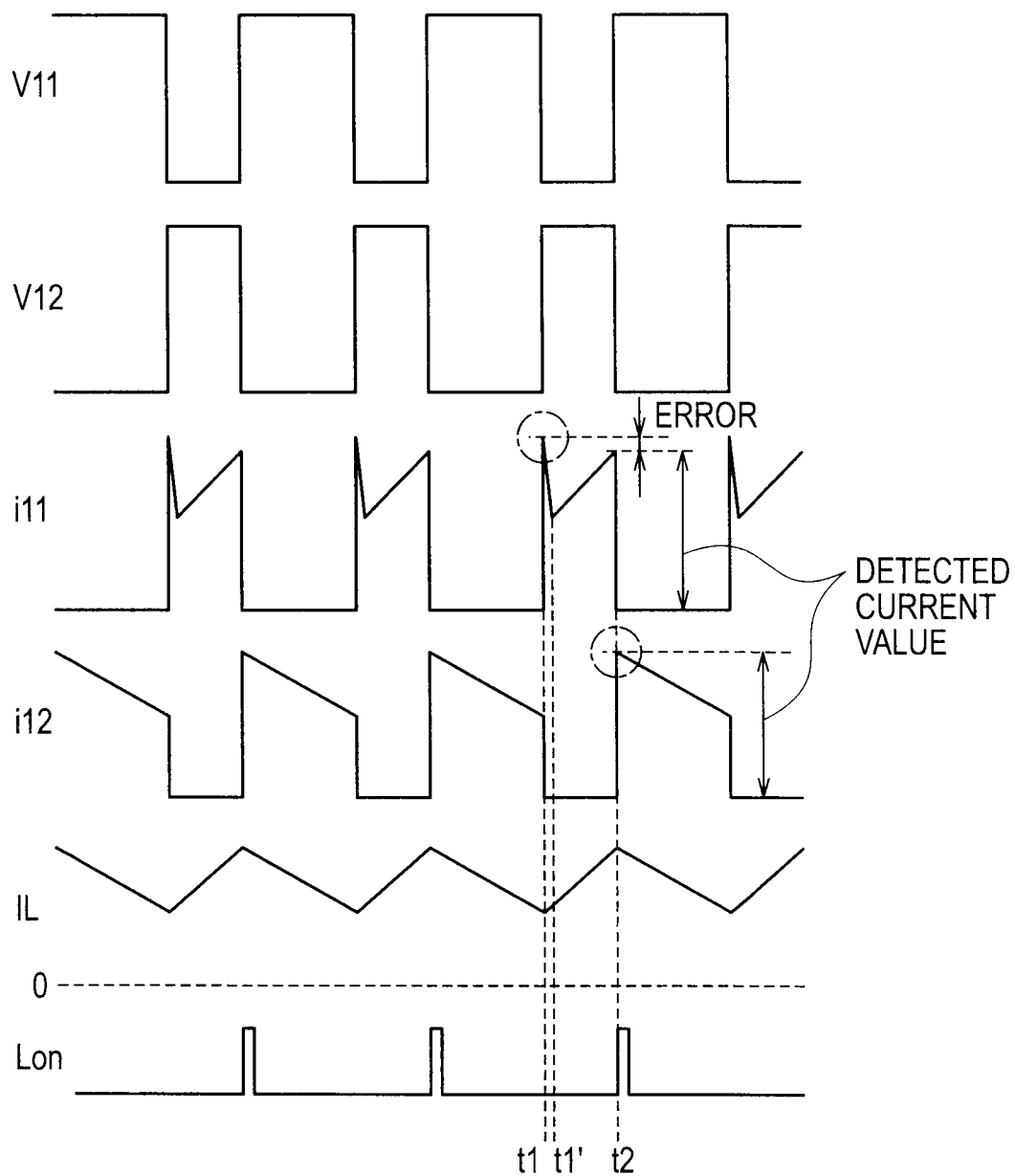
FIG. 19 is a timing chart explaining an advantage of detecting an overcurrent based on a drain current of a low-side MOSFET according to Embodiment 2 of FIG. 17.

FIG. 19 is a timing chart explaining an advantage of detecting an overcurrent according to a drain current of the low-side MOSFET 12. In FIG. 19, v11 is a drain-source voltage waveform of the high-side MOSFET 11, i11 is a drain-source current waveform of the same, v12 is a drain-source voltage waveform of the low-side MOSFET 12, i12 is a drain-source current waveform of the same, IL is a current waveform of the reactor 13, and Lon is an ON/OFF waveform of the switch 291.

As illustrated in FIG. 19, when a current is detected according to an ON resistance of the high-side MOSFET 11, a parasitic capacitance existing between the drain and source of the low-side MOSFET 12 causes a surge current when the high-side MOSFET 11 turns on at time t1. Accordingly, a current value detected by the overcurrent detector includes an error due to the surge current occurring at the turn-on timing of the high-side MOSFET 11.

To avoid the influence of the surge current, a general measure is to delay the current detection timing behind the turn-on timing of the high-side MOSFET 11. In this case, the overcurrent detector must detect a current after time t1' that is behind time t1.

If the switching frequency of the high-side MOSFET 11 reaches several megahertz, however, the delay time must be contained within a very small difference between a surge current passing period and an ON time of the high-side MOSFET 11 in an overcurrent state. In this case, the current detecting time needed by the overcurrent detector is hardly secured.

To deal with this problem, the technique of detecting a current according to an ON resistance between the drain and source of the low-side MOSFET 12. At time t2 when the low-side MOSFET 12 turns on, no surge current occurs, and therefore, no overcurrent detection error occurs.

As mentioned above, the switching power source apparatus according to Embodiment 2 of the present invention provides effect similar to that provided by Embodiment 1. Since the high side has a risk of causing a surge current, the switching power source apparatus of Embodiment 1 may have to have a mask circuit, if operated at high frequencies, to avoid an overcurrent detection error. In this case, the switching power source apparatus of Embodiment 2 is advantageous because it detects an overcurrent based on a drain current of the low-side MOSFET 12, and therefore, needs no measures for the surge current.

In summary, the switching power source apparatus according to any embodiment of the present invention realizes a proper overcurrent protection characteristic, stable operation even with an output capacitor having a small ESR, and good load regulation characteristic.

The switching power source apparatus according to the present invention is applicable to electric equipment that needs a stable power supply.

This application claims benefit of priority under 35USC §119to Japanese Patent Application No. 2010-177815, filed on Aug. 8, 2010, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A switching power source apparatus comprising:
   a high-side switch connected between an input voltage line and an inductor;
   a ramp signal generator configured to generate a ramp signal in synchronization with a switching frequency of the high-side switch;
   a superposing circuit configured to generate a second ramp signal having a positive inclination corresponding to the amplitude and frequency of the ramp signal and provide a superposed signal by superposing the second ramp signal on a first reference voltage;
   a controller configured to compare the superposed signal with a feedback signal corresponding to an output voltage, and if the feedback signal is lower than the superposed signal, control the ON timing of the high-side switch so that the high-side switch turns on;
   an overcurrent detector configured to detect if a current passing through an output load is an overcurrent;
   an OFF timer configured to determine a period during which the high-side switch is forcibly turned off based on a detection result of the overcurrent detector, the input voltage, and the output voltage, and generate a forcible OFF signal based on the determined period, wherein
   if the overcurrent detector detects an overcurrent, the controller turns off the high-side switch, and forcibly turns off the high-side switch for the determined period according to the forcible OFF signal, and
   a feedforward part configured to generate a feedforward current that is inversely proportional to the input voltage and proportional to the output voltage, wherein
   the OFF timer determines the period during which the high-side switch is forcibly turned off according to the feedforward current and a detection result of the overcurrent detector and generates the forcible OFF signal based on the determined period.

2. The switching power source apparatus of claim 1, wherein
   the overcurrent detector detects an overcurrent if a current passing through the high-side switch is equal to or greater than a predetermined threshold value.

3. The switching power source apparatus of claim 1, further comprising
   a low-side switch arranged between the inductor and the ground, wherein
   the overcurrent detector detects an overcurrent if a current passing through the low-side switch is equal to or greater than a predetermined threshold value.

4. The switching power source apparatus of claim 3, wherein
   the overcurrent detector samples and holds a low-side-switch current signal corresponding to a current passing through the low-side switch in an ON period of the low-side switch, and detects an overcurrent according to the sampled and held low-side-switch current signal in an ON period of the high-side switch.

5. A switching power source apparatus comprising:
   a high-side switch connected between an input voltage line and an inductor;
   a ramp signal generator configured to generate a ramp signal in synchronization with a switching frequency of the high-side switch;
   a superposing circuit configured to generate a second ramp signal having a positive inclination corresponding to the amplitude and frequency of the ramp signal and provide a superposed signal by superposing the second ramp signal on a first reference voltage;
   a controller configured to compare the superposed signal with a feedback signal corresponding to an output voltage, and if the feedback signal is lower than the superposed signal, control the ON timing of the high-side switch so that the high-side switch turns on;
   an overcurrent detector configured to detect if a current passing through an output load is an overcurrent;
   an OFF timer configured to determine a period during which the high-side switch is forcibly turned off based on a detection result of the overcurrent detector, the input voltage, and the output voltage, and generate a forcible OFF signal based on the determined period, wherein
   if the overcurrent detector detects an overcurrent, the controller turns off the high-side switch, and forcibly turns off the high-side switch for the determined period according to the forcible OFF signal, and
   a feedforward part configured to generate a feedforward current that is inversely proportional to the input voltage and proportional to the output voltage, wherein the OFF timer determines the period during which the high-side switch is forcibly turned off according to the feedforward current and a detection result of the overcurrent detector and generates the forcible OFF signal based on the determined period an amplitude signal generator configured to generate an amplitude signal corresponding to an amplitude of the ramp signal, wherein the controller controls an ON width of the high-side switch so that the ramp signal maintains a predetermined amplitude based on the amplitude signal wherein the amplitude signal generator includes:

a sample hold circuit configured to hold a valley voltage of the ramp signal; and an error amplifier configured to compare the valley voltage with a second reference voltage and generate an error amplified signal representative of a result of the comparison as the amplitude signal.

6. A switching power source apparatus comprising:

a high-side switch connected between an input voltage line and an inductor;

a ramp signal generator configured to generate a ramp signal in synchronization with a switching frequency of the high-side switch;

a superposing circuit configured to generate a second ramp signal having a positive inclination corresponding to the amplitude and frequency of the ramp signal and provide a superposed signal by superposing the second ramp signal on a first reference voltage;

a controller configured to compare the superposed signal with a feedback signal corresponding to an output voltage, and if the feedback signal is lower than the superposed signal, control the ON timing of the high-side switch so that the high-side switch turns on;

an overcurrent detector configured to detect if a current passing through an output load is an overcurrent;

an OFF timer configured to determine a period during which the high-side switch is forcibly turned off based on a detection result of the overcurrent detector, the input voltage, and the output voltage, and generate a forcible OFF signal based on the determined period, wherein if the overcurrent detector detects an overcurrent, the controller turns off the high-side switch, and forcibly turns off the high-side switch for the determined period according to the forcible OFF signal, and a feedforward part configured to generate a feedforward current that is inversely proportional to the input voltage and proportional to the output voltage, wherein the OFF timer determines the period during which the high-side switch is forcibly turned off according to the feedforward current and a detection result of the overcurrent detector and generates the forcible OFF signal based on the determined period an amplitude signal generator configured to generate an amplitude signal corresponding to an amplitude of the ramp signal, wherein the controller controls, based on the amplitude signal, an ON width of the high-side switch in such a way as to widen the ON width as the amplitude of the ramp signal is smaller than a predetermined value and narrow the ON width as the amplitude of the ramp signal is equal to or greater than the predetermined value wherein the amplitude signal generator includes:

a sample hold circuit configured to hold a valley voltage of the ramp signal; and an error amplifier configured to compare the valley voltage with a second reference voltage and generate an error amplified signal representative of a result of the comparison as the amplitude signal.

* * * * *